United States Patent Office 3,595,653

Patented July 27, 1971

3,595,653
ACID-CONTAINING LACQUER FOR PLANOGRAPHIC PRINTING PLATES

Hartmut Steppan, Wiesbaden-Dotzheim, and Fritz Uhlig, Wiesbaden-Biebrich, Germany, assignors to Kalle Aktiengesellschaft, Wiesbaden-Biebrich, Germany Filed May 15, 1967, Ser. No. 638,646
Claims priority, application Germany, May 18, 1966, K 59,297
Int. Cl. G03f 7/02
U.S. Cl. 96—33 12 Claims

ABSTRACT OF THE DISCLOSURE

Disclosed is an improvement of a known planographic printing plate lacquer comprising a water insoluble film-forming resin in solution in a solvent mixture containing about 40 to 80% by weight of a polyhydric alcohol, the improvement being the addition of about 0.05 to 10% by weight of an acid, other than oxalic, having a dissociation constant greater than $10^{-3}$ at 20° C.

BACKGROUND OF THE INVENTION

The field of the invention is the lacquering of light-sensitive planographic printing plate materials after their exposure to light, either after development or, preferably, as a simultaneous developing and lacquering step.

Prior art is represented by U.S. Pat. No. 3,313,233.

SUMMARY OF THE INVENTION

The present invention is an improvement over the lacquer for planographic printing plates disclosed and claimed in U.S. Pat. No. 3,313,233, by means of which the drawbacks of this lacquer are overcome. The improvement is in the effectiveness of the lacquer, i.e. a substantial increase of the development speed thereof, which is caused by the addition of 0.05 to 10 percent by weight, based on the total weight of the lacquer, of at least one inorganic acid or organic sulfonic acid or carboxylic acid which has a dissociation constant at 20° C. of more than $10^{-3}$.

From U.S. Pat. No. 3,313,233, a lacquer for printing plates is known which comprises a non-hardenable phenol/formaldehyde resin or a non-hardenable phenol-carboxylic acid/formaldehyde resin in dissolved form and, in addition to at least one other organic solvent, at least one polyhydric aliphatic alcohol in such a quantity that the proportion of polyhydric aliphatic alcohol constitutes at least 40 percent by weight of the total sum of solvents contained in the lacquer. In addition thereto, the lacquer advantageously contains a coloring medium. This lacquer serves for reinforcing images on planographic printing plates prepared by photomechanical means. It is preferably used with planographic printing forms which have been prepared from presensitized planographic printing plate material, e.g. material presensitized by means of diazonium salts or the condensation products thereof with formaldehyde, quinone diazides, naphthoquinone diazides, or azido compounds.

The lacquer preferably is applied in a lacquering process in which the presensitized printing plate material, which has been exposed under an original but not treated with a developer, is directly treated with the lacquer disclosed in the patent, supra. Thus, development and lacquering are performed in one step in this process.

This otherwise very successful process has the drawback that, in some cases, the lacquering-development process proceeds relatively slowly so that it is sometimes preferred to repeat the lacquer application in order to accelerate the development of the plate. This repeated lacquering of the plate, however, impairs the quality of the lacquer image, because the image is partially dissolved superficially, i.e. weakened, by the newly applied lacquer, and is not uniformly built up again by further applications of the lacquer. This drawback may be overcome to a certain degree by using sufficient lacquer for the second application that practically all of the original lacque image is dissolved away and replaced by a second lacquer image. This method is disadvantageous, however, because of the large quantities of lacquer consumed.

The following acids are exemplary of effective acids to be employed in the present invention: hydrochloric acid, hydrobromic acid, sulfuric acid, nitric acid, phosphoric acid, phosphorous acid, methane sulfonic acid, o-phthalic acid, malonic acid, maleic acid, and 2,6-dihydroxybenzoic acid. Oxalic acid is an exception. In spite of its high acidity, it cannot be successfully used in the process according to the invention.

The addition of very strong inorganic acids, in particular hydrochloric acid, but also sulfuric acid and nitric acid, yields very fast-working lacquers. The strong acids, e.g. sulfuric acid, nitric acid, hydrochloric acid, hydrobromic acid and other acids having a dissociation constant of 1 or more, also may be used in the form of their salts with a weak organic base the dissociation constant of which does not exceed $10^{-5}$, e.g., diphenylamine, or with amides, e.g. dimethyl formamide, urea, and the like. This does not, however, result in additional advantages.

The following are exemplary of the polyhydric aliphatic alcohol which must be present in the lacquer: Ethylene glycol, diethylene glycol, triethylene glycol, and polyglycols of higher molecular weight, glycerol, 1,3-dihydroxypropanol, pentaerythritol, and 1,2,4-butanetriol. The proportion of the aliphatic alcohol or of the mixture of aliphatic alcohols is at least 40 percent, advantageously, however, 50 to 70 percent of the whole quantity of solvents present. Examples of the organic solvent required as a further constituent of the lacquer according to the invention are: aliphatic alcohols, such as methanol, ethanol, propanol, isopropanol, butanol and isobutanol; aliphatic ketones, such as methylisobutyl ketone, methylethyl ketone, methylpropyl ketone, diisobutyl ketone, methylamyl ketone, and ethylamyl ketone; esters, such as amyl acetate, butyl acetate, methylglycol acetate, glycol acetate, cyclohexyl acetate, and ethylglycol acetate; alkoxy alcohols, such as glycolmonomethylether and glycolmonoethylether; cyclic ketones, such as cyclohexanone, and hydrogenated hydrocarbons, such as tetrahydronaphthalene.

For the preparation of printing plates from presensitized printing plate material, preferably material carrying a water-soluble reproduction layer, the following procedure is followed: The printing plate material is exposed under an original in the usual manner. Then, the material is treated with the lacquer according to the invention by applying an appropriate quantity of the lacquer to the image side of the material and distributing it as evenly as possible over the entire surface until the image becomes visible. The developed and lacquered printing plate thus obtained is then thoroughly cleaned with water, preferably by means of a water spray. The plate now may be used immediately for printing. If printing from the plate is to be deferred, inking of the lacquer image with greasy ink and gumming of the plate is recommended.

To further illustrate the present invention, a number of formulae for the lacquers according to the invention are given below as examples. In these examples, one part by weight is 1 g. when 1 ml. is used as one part by volume.

Where a novolak is used in the examples, this is a non-hardenable phenol/formaldehyde resin having a melting range from 108–118° C. The preparation of the reaction product of phenol resin and chloroacetic acid, employed in one of the following examples, is described in German Pat. No. 1,053,930.

Advantageously, the lacquer contains a coloring medium. The dyestuffs used in the following examples as coloring media are described in detail in Schultz' "Farbstofftabellen," 7th edition, Leipzig, 1932, vol. I: Methyl Violet 2 B, No. 783, page 327 (Schultz); Rhodamine B, No. 864, page 365 (Schultz); Fatty Red G, Color Index No. 12150; Victoria Pure Blue B, No. 822, page 347 (Schultz); Sudan Red, No. 976, page 421 (Schultz); Crystal Violet, No. 785, page 328 (Schultz).

EXAMPLE 1

40 parts by weight of methylglycol acetate
60 parts by weight of ethyleneglycol
0.8 part by weight of Methyl Violet 2 B
5 parts by weight of dichloroacetic acid
9 parts by weight of novolak.

EXAMPLE 2

35 parts by weight of cyclohexanone
65 parts by weight of ethyleneglycol
5 parts by weight of novolak
0.5 part by weight of Rhodamine B
2 parts by weight of 2,6-dihydroxybenzoic acid.

EXAMPLE 3

40 parts by weight of cyclohexanone
60 parts by weight of glycolmonoethylether
5 parts by weight of novolak
0.3 part by weight of Fatty Red
1.1 part by weight of 36% aqueous hydrochloric acid solution.

EXAMPLE 4

35 parts by weight of ethyleneglycol monomethylether
65 parts by weight of ethyleneglycol
5 parts by weight of novolak
0.5 part by weight of Victoria Pure Blue B
4 parts by weight of phosphorous acid.

EXAMPLE 5

25 parts by weight of cyclohexanone
25 parts by weight of 1,3-dihydroxypropanol
2.5 parts by weight of reaction product of phenol resin and chloroacetic acid
0.4 part by weight of Sudan Red
1 part by weight of p-toluene sulfonic acid monohydrate.

EXAMPLE 6

28 parts by weight of ethyleneglycol
30 parts by weight of glycerol
25 parts by weight of ethyleneglycol monomethylether acetate
20 parts by weight of isopropanol
0.5 part by weight of Crystal Violet
5 parts by weight of novolak.

The following acid additions result in the inventive improvement of the lacquer of Example 6 over the lacquer containing no such acids:

(a) 0.86 parts by weight of sulfuric acid (96%)
(b) 2.0 parts by weight of maleic acid
(c) 0.5 part by weight of maleic acid
(d) 0.9 part by weight of methane sulfonic acid
(e) 2.2 parts by weight of nitric acid (50%).

EXAMPLE 7

25 parts by volume of methylglycol acetate
25 parts by volume of isopropanol
5 parts by weight of novolak
40 parts by volume of ethyleneglycol
10 parts by volume of glycerol
2 parts by weight of diphenylamine (hydrochloride)
0.5 part by weight of Crystal Violet.

The lacquer preferably is employed for developing and lacquering exposed presensitized printing plates, e.g. plates which contain in their reproduction layer a light-sensitive diazo compound or azido compound or a substance which contains cinamic acid or chalcone groups and which cross-links upon exposure to light, or a light-polymerizable substance. However, the lacquer according to the invention also is of advantage when applied to already developed printing plate material, because it improves the hydrophilic properties of the bared surface of the support in the image-free areas and prevents scumming of the image background by the reinforcing lacquer.

It will be obvious to those skilled in the art that many modifications may be made within the scope of the present invention without departing from the spirit thereof, and the invention includes all such modifications.

What is claimed:

1. In a lacquer for printing plates which comprises about 3 to 20 percent, based on the weight of the lacquer, of a resinous water-insoluble film-forming substance in solution in a solvent mixture containing about 40 to 80 percent by weight, based on the weight of the solvent mixture, of a polyhydric alcohol with the balance of the solvent mixture being at least one other organic solvent, the improvement which comprises the addition of about 0.05 to 10 percent by weight, based on the weight of the lacquer, of an effective acid, other than oxalic acid, having a dissociation constant at 20° C. of more than $10^{-3}$.

2. A lacquer according to claim 1 in which the acid is a mineral acid.

3. A lacquer according to claim 1 in which the acid is an organic sulfonic acid.

4. A lacquer according to claim 1 in which the acid is a carboxylic acid.

5. A lacquer according to claim 1 containing a dyestuff.

6. A lacquer according to claim 1 in which the film-forming substance is the reaction product of a novolak with a halogenated carboxylic acid.

7. In a process for improving a planographic printing plate which comprises applying to the entire surface of the image-wise light-exposed plate until the image becomes visible a lacquer comprising about 3 to 20 percent, based on the weight of the lacquer, of a resinous water-soluble film-forming substance in solution in a solvent mixture containing about 40 to 80 percent by weight, based on the weight of the solvent mixture, of a polyhydric alcohol with the balance of the solvent mixture being at least one other organic solvent, the improvement which comprises the addition to the lacquer of about 0.05 to 10 percent by weight, based on the weight of the lacquer, of an effective acid, other than oxalic acid, having a dissociation constant at 20° C. of more than $10^{-3}$.

8. A process according to claim 7 in which the acid is a mineral acid.

9. A process according to claim 7 in which the acid is an organic sulfonic acid.

10. A process according to claim 7 in which the acid is a carboxylic acid.

11. A process according to claim 7 in which the lacquer contains a dyestuff.

12. A process according to claim 7 in which the film-forming substance is the reaction product of a novolak with a halogenated carboxylic acid.

References Cited

UNITED STATES PATENTS 3,373,115 3/1968 Steppan .............. 96—33

FOREIGN PATENTS 263,604 6/1964 Australia .............. 96—33

NORMAN G. TORCHIN, Primary Examiner

J. WINKELMAN, Assistant Examiner

U.S. Cl. X.R.

96—49; 101—466